UNITED STATES PATENT OFFICE.

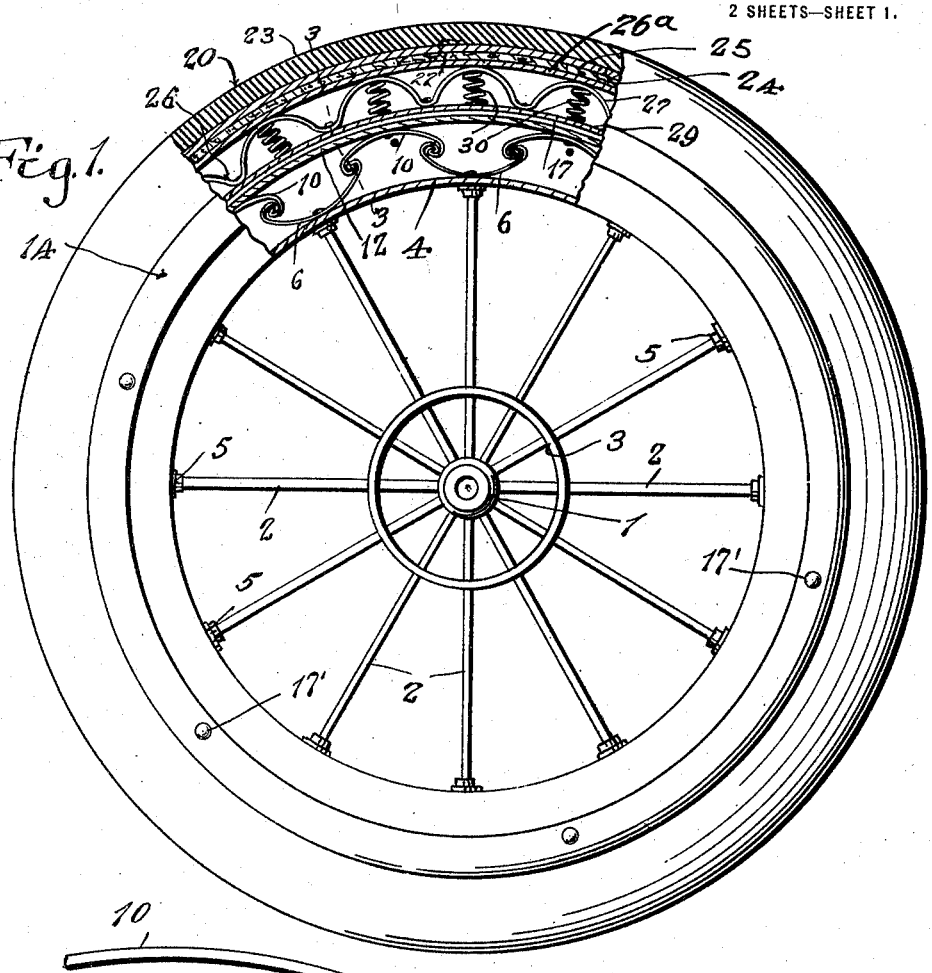
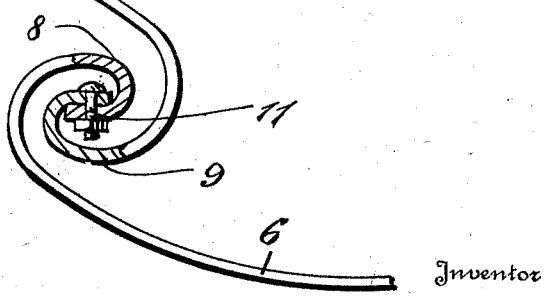

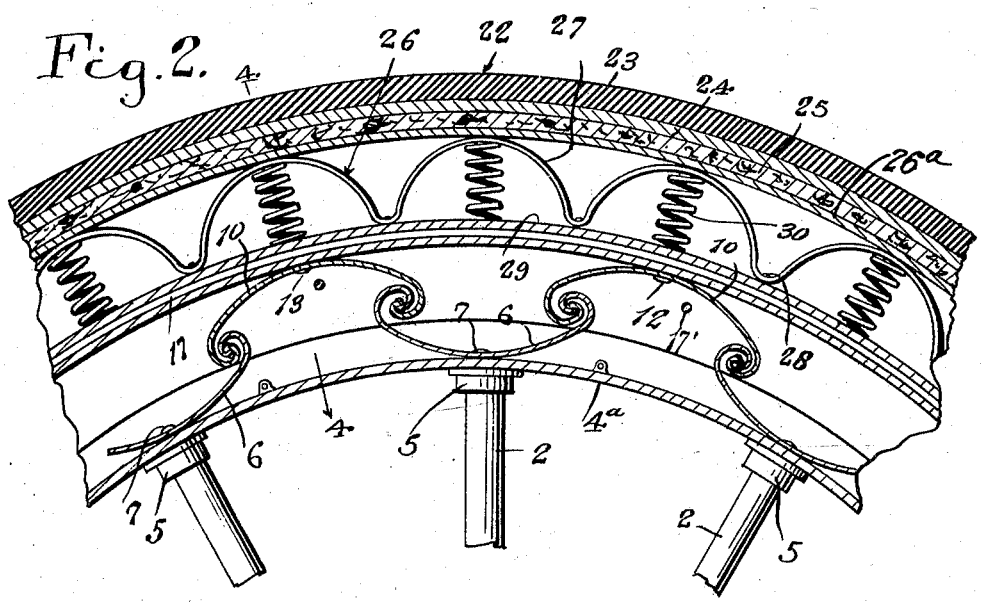
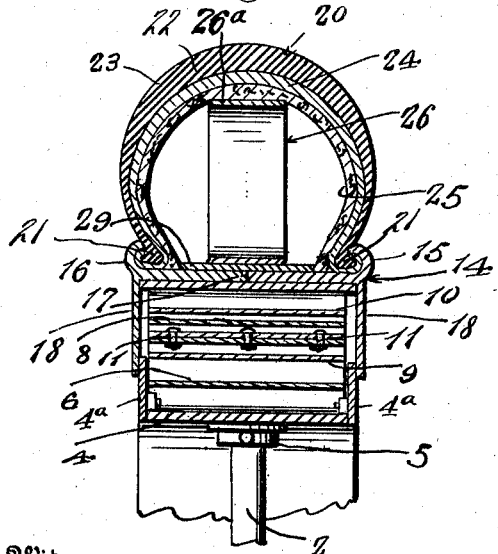
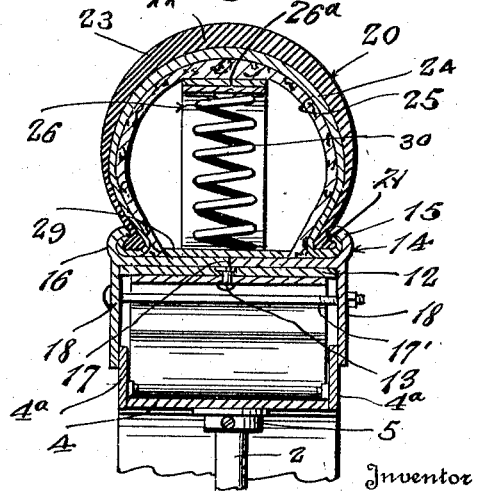

PERCY M. GRIGGS, OF FORT BRIDGER, WYOMING.

RESILIENT WHEEL.

1,315,300. Specification of Letters Patent. Patented Sept. 9, 1919.

Application filed November 24, 1916. Serial No. 133,196.

*To all whom it may concern:*

Be it known that I, PERCY M. GRIGGS, a citizen of the United States, residing at Fort Bridger, in the county of Uinta and State of Wyoming, have invented certain new and useful Improvements in Resilient Wheels; and I do hereby declare the following to be a full, clear, and exact description of the invention, such as will enable others skilled in the art to which it appertains to make and use the same.

This invention relates to motor vehicle wheels, and the primary object of the invention is to provide a wheel having a resilient rim structure, upon the outer surface of which a resilient tire structure is mounted, for absorbing shocks occasioned by travel of the vehicle wheel over rough places in a roadway, which resilient wheel and tire structure will replace the ordinary pneumatic tire employed for this purpose.

Another object of this invention is to provide a resilient wheel structure including a hub having a plurality of radiating spokes extending outwardly therefrom, to the outer ends of which spokes is attached a circular band or rim of metal, and to attach a plurality of arcuate springs to the rim, which springs have their ends in turn connected to arcuate springs which are curved oppositely to the springs attached to the inner band and are attached to an outer band or rim, for providing a resilient rim structure for the wheel.

A still further object of this invention is to provide a resilient tire structure which is mounted about the resilient rim structure and includes an outer shoe or casing constructed in the ordinary manner, or in any desired manner, which casing or shoe has a flat spring positioned therein, which flat spring is curved sinuously, forming curved portions which engage the inner surface of the tread portion of the shoe or casing and curved portions which engage the outer surface of a plate which is positioned against the outer surface of an ordinary demountable rim which is attached to the resilient wheel rim, and further to provide a plurality of coil springs which are positioned within the tire, at spaced intervals about the circumference of the same, and extend radially of the hub of the wheel for coacting with the sinuously bent flat spring for absorbing shock.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a side elevation of a wheel constructed in accordance with this invention, showing a part of the resilient rim and resilient tire structures in section.

Fig. 2 is an enlarged sectional view through a part of the resilient rim and tire structure.

Fig. 3 is a section on the line 3—3 of Fig. 1.

Fig. 4 is a section on the line 4—4 of Fig 2, and

Fig. 5 is a detail view partially in section illustrating the manner of connecting the arcuate flat springs of the resilient rim structure.

Referring more particularly to the drawings, 1 designates the hub of the wheel which has a plurality of radiating spokes 2 connected thereto. A circular band 3 is attached to the spokes outwardly of the hub 1 for reinforcing them.

A flat circular metal band or inner rim 4 is attached to the outer ends of the spokes 2 in any suitable manner, as indicated at 5 and this rim has a plurality of arcuate springs 6 attached thereto as shown at 7. The springs 6 are curved, so as to present their convex surfaces toward the outer surface of the rim 4, and they have their ends coiled as shown at 8, and attached to the coiled ends 9 of arcuate springs 10 by means of screws or bolts as indicated at 11 in Fig. 5 of the drawings. The arcuate springs 10 bow oppositely to the springs 6, and present their convex surfaces to an outer rim or band 12. The springs 10 are attached to the band 12 in any suitable manner, such as by rivets or the like as indicated at 13. The provision of the arcuate springs 6 and 10, being oppositely curved, will permit of disfiguration of the rim structure, and facilitate in cushioning shocks occasioned by the travel of the wheel over rough places in a roadway.

The metal band or inner rim 4 is provided with spaced outwardly projecting radially directed securing lugs by means of which side plates 4ª are detachably secured to the rim 4 through the medium of securing screws, or in any other suitable manner. These side plates are of such width as to fit within the outer rim section thus producing a telescoping structure which permits movement of the outer rim section toward and away from the inner rim section while serving to protect the springs 6 and 10 from dust, grit, and other foreign material.

The outer rim 12 has a demountable rim structure 14 mounted thereon, which comprises sections 15 and 16, having their inner edges abutting, as clearly shown at 17 in Figs. 3 and 4 of the drawings. The sections 15 and 16 are held about the resilient rim structure by means of bolts 17' inserted through flanges 18 of the sections.

The resilient tire structure generically indicated by the numeral 20 is connected to the demountable rim structure 14 in the usual manner, as by means of the beads 21 formed about the edges of the shoe or casing 22 of the tire structure.

The shoe 22 of the tire structure is preferably constructed of an outer layer 23 of rubber, an intermediate layer 24 of canvas which is impregnated with rubber, and an inner layer 25 of cork. The shoe 22 has a spring, or if it is desired a plurality of springs 26 mounted therein, which are bent sinuously, presenting curved surfaces 27, which engage the inner surface of a resilient band 26ª mounted at the tread portion of the shoe 22, and curved portions 28, which engage the outer surface of a plate 29. The plate 29 is constructed of spring steel or analogous material, and it engages the outer surface of the demountable rim structure 14, as clearly shown in Figs. 3 and 4 of the drawings.

The plate 29 has a plurality of coil springs 30 connected thereto, which coil springs engage the inner surface of the curved portion 27 of the sinuously bent springs 26.

In reducing the invention to practice, certain minor features of construction, combination and arrangement of parts may necessitate alterations to which the patentee is entitled provided such alterations are comprehended within the scope of what is claimed.

What is claimed is:—

1. In a resilient wheel structure, the combination, of a hub, a plurality of radiating spokes connected to said hub, a circular metal band attached to the outer ends of said spokes, a plurality of arcuate springs, having their convex surfaces facing the outer surface of said metallic band, means for securing said springs to said band, a second plurality of arcuate springs being curved oppositely to the first named plurality of arcuate springs, a second metal band positioned exteriorly of and secured to said second plurality of arcuate springs, said springs having their ends coiled and connected for forming a continuous sinuous spring between the inner and outer metal bands.

2. In a resilient wheel structure, the combination, of a hub, a plurality of radiating spokes connected to said hub, a circular metal band attached to the outer ends of said spokes, a plurality of arcuate springs, having their convex surfaces facing the outer surface of said metallic band, means for securing said springs to said band, a second plurality of arcuate springs being curved oppositely to the first named plurality of arcuate springs, a second metal band positioned exteriorly of and secured to said second plurality of arcuate springs, said springs having their ends coiled and connected for forming a continuous sinuous spring between the inner and outer metal bands, a demountable rim structure mounted about said outer metal band, and a resilient tire connected to said demountable rim structure.

3. In a resilient wheel structure, the combination of a hub, a plurality of radiating spokes connected to said hub, a circular metal band attached to the outer ends of said spokes, a plurality of arcuate springs having their convex surfaces facing the outer surface of said metallic band, means for securing said springs to said band, a second plurality of arcuate springs curved oppositely to the first named plurality of arcuate springs, a second metal band positioned exteriorly of and secured to said second plurality of arcuate springs, the ends of said springs being coiled, the coils of the meeting ends of the springs curving one within the other, the terminals of the meeting coiled ends being flat and lying in facial engagement with each other, and bolts extending through and detachably connecting the engaging terminals.

In testimony whereof I affix my signature in presence of two witnesses.

PERCY M. GRIGGS.

Witnesses:
N. W. GRIGGS,
W. C. CASTO.

Copies of this patent may be obtained for five cents each, by addressing the "Commissioner of Patents, Washington, D. C."